US012775655B1

(12) United States Patent
Adeshina et al.

(10) Patent No.: US 12,775,655 B1
(45) Date of Patent: Oct. 27, 2026

(54) COMPUTER-IMPLEMENTED METHODS FOR ENHANCING TEMPORAL UNDERSTANDING IN RETRIEVAL-AUGMENTED GENERATION THROUGH TEMPORAL-AWARE RETRIEVAL

(71) Applicant: Amazon Technologies, Inc., Seattle, WA (US)

(72) Inventors: Adesoji Adeshina, Oakland, CA (US); Huzefa Rangwala, Washington, DC (US); Vasileios N. Ioannidis, Menlo Park, CA (US); Konstantinos Mavromatis, New York, NY (US); Zhen Han, San Jose, CA (US); Bonan Min, Palo Alto, CA (US); Miyoung Ko, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 19/096,415

(22) Filed: Mar. 31, 2025

(51) Int. Cl.
*G06F 16/38* (2019.01)
*G06F 16/332* (2019.01)
(Continued)

(52) U.S. Cl.
CPC ............ *G06F 16/38* (2019.01); *G06F 16/332* (2019.01); *G06F 16/334* (2019.01); *G06F 16/338* (2019.01)

(58) Field of Classification Search
CPC ...................................................... G06F 16/38
(Continued)

(56) References Cited

U.S. PATENT DOCUMENTS

| | | | | |
|---|---|---|---|---|
| 2017/0337265 A1* | 11/2017 | Garrett | .................. | G06F 16/338 |
| 2024/0064074 A1* | 2/2024 | Raman | ................ | H04L 43/0852 |
| 2025/0378537 A1* | 12/2025 | Crabtree | .................. | G06T 5/60 |

OTHER PUBLICATIONS

Barik, Anab Maulana et al., "Time Matters: An End-to-End Solution for Temporal Claim Verification", Proceedings of the 2024 Conference on Empirical Methods in Natural Language Processing: Industry Track, Nov. 2024, 8 pages.

(Continued)

*Primary Examiner* — Syling Yen
(74) *Attorney, Agent, or Firm* — Nicholson DeVos Webster & Elliott LLP

(57) ABSTRACT

The present disclosure relates to methods, apparatus, systems, and non-transitory computer-readable storage media for performing a temporal-aware retrieval-augmented generation (RAG) for machine learning. According to some examples, a computer-implemented method includes receiving, by a provider network, a search query from a user device; performing, by the provider network, a search based on the search query to generate a set of candidate documents; generating, by one or more machine learning models of the provider network, a semantic rank of the set of candidate documents for the search query; determining, by the one or more machine learning models of the provider network, a temporal expression in the search query; generating, by the one or more machine learning models of the provider network, a temporal rank of the set of candidate documents for the search query based at least in part on the temporal expression; generating, by the one or more machine learning models of the provider network, a combined rank of the set of candidate documents based on the semantic rank and the temporal rank; generating, by the one or more machine learning models of the provider network, a response based on the search query and a retrieval-augmented generation (RAG) input of the combined rank;
(Continued)

and sending, by the provider network, the response to the user device.

20 Claims, 11 Drawing Sheets

(51) Int. Cl.
*G06F 16/334* (2025.01)
*G06F 16/338* (2019.01)
(58) Field of Classification Search
USPC .......................................................... 707/758
See application file for complete search history.

(56) References Cited

OTHER PUBLICATIONS

Chang, Yupeng et al., "A Survey on Evaluation of Large Language Models", ACM Transactions on Intelligent Systems and Technology, vol. 15, Issue 3, Article 39, Mar. 29, 2024, 45 pages.
Gupta, Vivek et al., "TempTabQA: Temporal Question Answering for Semi-Structured Tables", Proceedings of the 2023 Conference on Empirical Methods in Natural Language Processing, Dec. 2023, pp. 2431-2453.
Jia, Zhen et al., "Faithful Temporal Question Answering over Heterogeneous Sources", arXiv:2402.15400v1, Feb. 23, 2024, 12 pages.
Jia, Zhen et al., "TIQ: A Benchmark for Temporal Question Answering with Implicit Time Constraints", WWW '24: Companion Proceedings of the ACM Web Conference, May 13, 2024, pp. 1394-1399.
Su, Zhaochen et al., "TIMO: Towards Better Temporal Reasoning for Language Models", arXiv:2406.14192v2, Aug. 19, 2024, 18 pages.
Tan, Qingyu et al., "Towards Benchmarking and Improving the Temporal Reasoning Capability of Large Language Models", Proceedings of the 61st Annual Meeting of the Association for Computational Linguistics (vol. 1: Long Papers), Jul. 2023, pp. 14820-14835.
Tan, Wang-Chiew et al., "Reimagining Retrieval Augmented Language Models for Answering Queries", Findings of the Association for Computational Linguistics: ACL 2023, Jul. 2023, pp. 6131-6146.
Tan, Wang-Chiew et al., "TimelineQA: A Benchmark for Question Answering over Timelines", Findings of the Association for Computational Linguistics: ACL 2023, Jul. 2023, pp. 77-91.
Wang, Yuqing et al., "TRAM: Benchmarking Temporal Reasoning for Large Language Models", Findings of the Association for Computational Linguistics: ACL 2024, Aug. 2024, pp. 6389-6415.
Wei, Yifan et al., "MenatQA: A New Dataset for Testing the Temporal Comprehension and Reasoning Abilities of Large Language Models", Findings of the Association for Computational Linguistics: EMNLP 2023, Dec. 2023, pp. 1434-1447.
Xiao, Shitao et al., "C-Pack: Packed Resources For General Chinese Embeddings", arXiv:2309.07597v5, Sep. 24, 2024, 9 pages.
Zhao, Wayne Xin et al., "A Survey of Large Language Models", arXiv:2303.18223v16, Mar. 11, 2025, 144 pages.
Zhou, Ben et al., "'Going on a vacation' takes longer than 'Going for a walk'": A Study of Temporal Commonsense Understanding, Proceedings of the 2019 Conference on Empirical Methods in Natural Language Processing and the 9th International Joint Conference on Natural Language Processing (EMNLP-IJCNLP), Nov. 2019, pp. 3363-3369.

* cited by examiner

COMPUTER-IMPLEMENTED METHODS FOR ENHANCING TEMPORAL UNDERSTANDING IN RETRIEVAL-AUGMENTED GENERATION THROUGH TEMPORAL-AWARE RETRIEVAL

BACKGROUND

Enterprises are generating more data than ever before. Trying to determine what data is relevant from that generated data is a non-trivial task. Traditional search solutions rely on keyword-based document analysis to find specific terms in the data which is a general-purpose approach inherently limited by its inability to "understand" the content at a more granular level.

BRIEF DESCRIPTION OF DRAWINGS

Various examples in accordance with the present disclosure will be described with reference to the following drawings.

DETAILED DESCRIPTION

Figure 1:
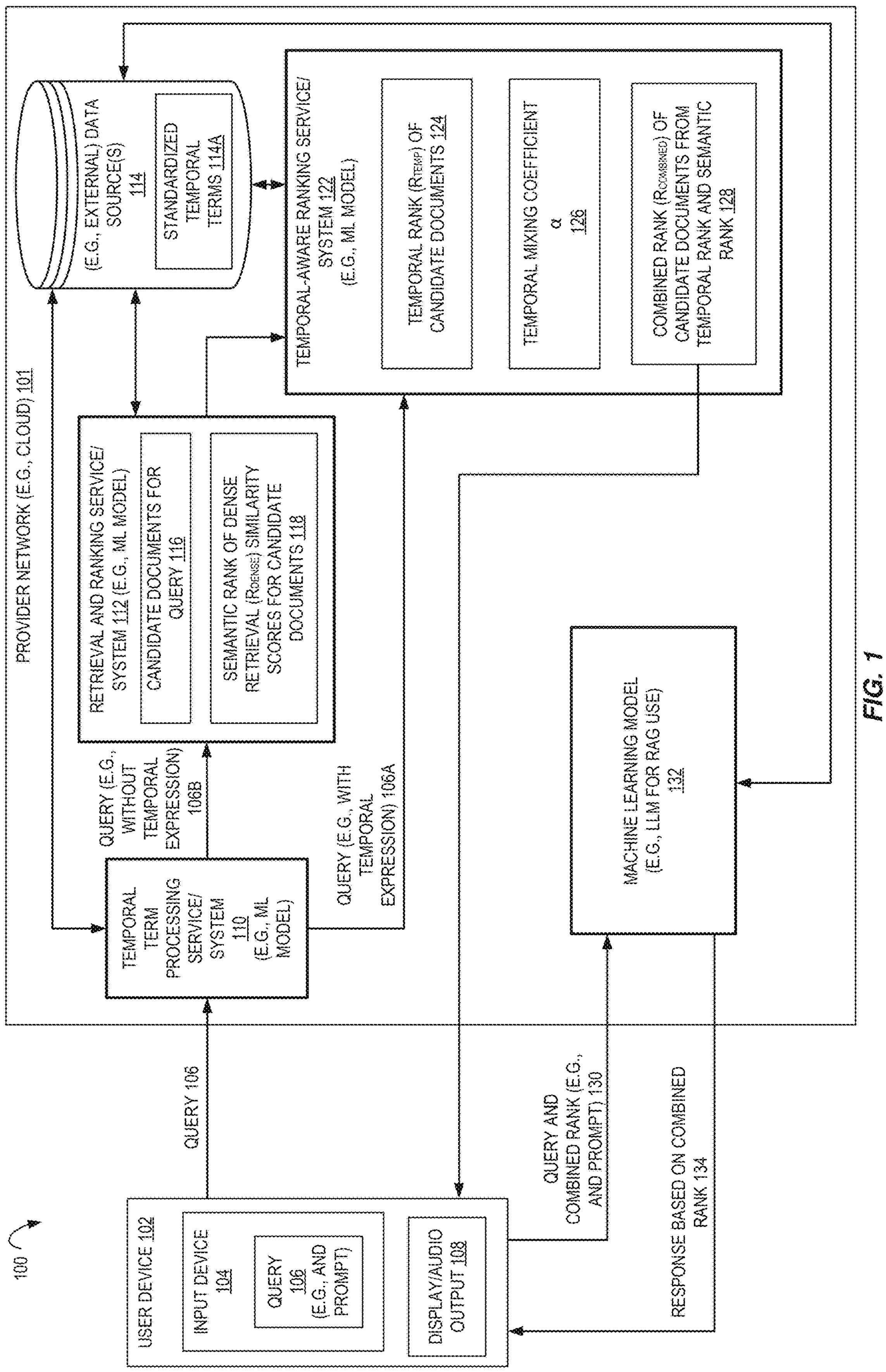
FIG. 1 is a diagram illustrating an environment including a provider network that includes one or more machine learning models that utilize temporal-aware retrieval to generate a response for a query from a user device according to some examples.

The present disclosure relates to methods, apparatus, systems, and non-transitory computer-readable storage media for performing a temporal-aware retrieval-augmented generation (RAG) for machine learning. Certain examples herein are directed to an adaptive time-fused retrieval, e.g., by enhancing temporal understanding in retrieval-augmented generation.

Temporal question answering (QA) is a challenge in natural language understanding due to the need for explicit time extraction and implicit temporal reasoning. Temporal QA of-ten involves processing semi-structured tables containing personal records where retrieval-augmented generation (RAG) approaches can effectively access relevant information. In certain examples, without RAG, a machine learning model (e.g., a large language model (LLM)) takes the user input (e.g., search query) and creates a response based on information it was trained on (e.g., what it already "knows"). In certain examples, with RAG, an information retrieval component is introduced that utilizes the user input (e.g., search query) to first pull information from a new (e.g., external) data source, and the user query and the relevant information are both provided to the machine learning model (e.g., LLM) so that the machine learning model (e.g., LLM) uses the new knowledge and its training data to create a better response.

Certain examples herein are directed to an efficient approach for incorporating temporal information into the retrieval stage of RAG, e.g., enabling more precise temporal QA over semi-structured tables. Certain examples herein convert temporal expressions from both the to-be-searched corpus (e.g., of documents) and a search query into a single (e.g., "standardized") format (e.g., standardized start and end dates), e.g., enabling precise temporal relevance calculations through a date range overlap analysis. Certain examples herein combine the temporal relevance (e.g., temporal score) with semantic (e.g., "standard") retrieval scores using an adaptive weighting mechanism that adjusts based on query-specific temporal importance, e.g., and uses the resulting combined temporally-aware scores (e.g., combined rank based on those scores) as a RAG input for the machine learning model (e.g., LLM). In certain examples, a proper subset of documents are selected based on their combined rank, and that proper subset is used as the RAG input for the LLM.

INTRODUCTION

As noted above, temporal question answering (QA) is an important area within natural language understanding that focuses on interpreting and responding to queries involving time-related information. Unlike standard question answering, temporal QA presents unique challenges that require services/systems to not only extract explicit temporal expressions but also perform temporal reasoning to understand the underlying complex relationships across time (e.g., years, months, weeks, days, hours, seconds, etc.) ranges.

Certain large language models may be utilized to handle natural language tasks, but have a technical problem of not performing precise temporal reasoning. This technical issue has practical implications across diverse domains, from historical research and event understanding (e.g., intelligence analysis) to real-time information retrieval, where accurate temporal understanding directly impacts the quality and relevance of insights derived from data. In certain examples, temporal QA processes diverse data sources, including structured and unstructured corpora of personal records, such as customers' weekly purchase histories or patients' medical records (with permission). Certain (e.g., those) datasets inherently contain temporal information essential for accurately addressing time-sensitive queries, but effectively incorporating temporal awareness into retrieval systems remains challenging.

As discussed further below in reference to FIG. 3, users may pose questions that reference specific dates (e.g., "2005

August 10th"), approximate periods (e.g., "the mid-2000s"), or broader life stages (e.g., "his 20s"). Standard retrievers (e.g., machine learning models that perform a retrieval) lack the ability to accurately interpret these varied temporal ranges, e.g., especially when confronted with approximate periods (e.g., ambiguous temporal expressions like "the mid-2000s"; which may span 2004 to 2006). This lack of ability to accurately interpret these varied temporal ranges results in retrieved documents that satisfy a semantic (e.g., meaning and context) relevance to a search query that includes a temporal expression but fail to meet temporal constraints or, conversely, match temporal criteria while lacking semantic alignment. This mismatch between semantic and temporal relevance ultimately undermines the performance of temporal QA systems, especially when queries require precise reasoning about overlapping and/or approximate time periods.

Certain approaches to temporal QA attempt to enhance an LLM's intrinsic temporal reasoning abilities through structured modules or leveraging retrieval-augmented methods to supplement LLMs with external evidence. However, in real usage scenarios, it is often unclear whether a given question requires temporal reasoning or not.

To address these challenges (e.g., as a technical solution), certain examples herein are directed to an efficient approach for incorporating temporal information into the retrieval stage of a RAG machine learning framework. Certain examples herein convert temporal expressions from both corpus and query into a single (e.g., standardized) format (e.g., standardized start and end dates), enabling precise temporal relevance calculations through date range overlap analysis. In certain examples, this temporal relevance (e.g., temporal rank/retrieval scores of candidate documents) is combined with semantic relevance (e.g., semantic rank/retrieval scores) through an adaptive mechanism that determines a temporal mixing coefficient (e.g., mixing ratio) based on query-specific temporal importance. In certain examples, this dynamic approach allows appropriate weighting of temporal factors based on each query's requirements, thus improving retrieval effectiveness for temporal queries while maintaining performance on non-temporal questions.

Certain examples herein seamlessly integrate with (e.g., standard) dense retrieval techniques, effectively incorporating temporal relevance in the retrieval process. Certain examples herein transform and compute temporal relevance based on a single format of temporal expression (e.g., standardized date ranges), ensuring precise temporal alignment between queries and corpus documents. Certain examples herein are directed to an adaptive fusion that dynamically combines temporal relevance with semantic (e.g., "standard") retrieval scores using a query specific temporal importance measure.

Additionally, certain examples herein are extensible to handle implicit temporal questions. In certain examples, implicit temporal questions involve queries where the temporal information is not explicitly stated but can be inferred from the context or the relationships between events. To address these types of questions, certain examples herein incorporate the inferred temporal expression(s) from the queries.

Temporal Question Answering

In certain examples, temporal question answering by a machine learning model addresses questions involving time-based information, e.g., requiring services/systems to process explicit and implicit temporal expressions. Certain examples focus on identifying events within specific time ranges, whether through explicit temporal constraints (e.g., "during 2022") or implicit temporal reasoning. In certain examples, these tasks extend beyond simple event matching to include complex temporal reasoning, such as date substitution in event sequences and handling overlapping time periods. In certain examples, temporal QA utilizes the temporal reasoning capabilities of large language models (LLMs), e.g., a LLM that performs temporal arithmetic operations and ordinal reasoning, such as computing date differences or determining relative event ordering. In certain examples, temporal QA searches a semi-structured data table, e.g., a data table that does not obey the tabular structure of data models associated with relational databases or other forms of data tables, but contains tags (e.g., metadata) or other markers (e.g., key-value pairs) to separate semantic elements and enforce hierarchies of records and fields within the data. In certain examples, temporal QA over a semi-structured table data is used for accessing information such as personal records.

Certain benchmarks, like TimelineQA for personal episode queries and TempTabQA for general temporal questions provide valuable evaluation frameworks, but they have inherent limitations in that they either lack temporal complexity or were not designed for retrieval-based evaluation. To bridge this gap, certain examples herein incorporate temporal information into the retrieval stage of RAG for temporal question answering.

Temporal Reasoning Approaches

In certain examples, temporal reasoning approaches to temporal QA enhance the intrinsic temporal reasoning abilities of LLMs, e.g., by using a framework that improves an LLMs' ability to handle temporal constraints by incorporating structured temporal reasoning modules. In certain examples, retrieval-augmented methods supplement LLMs with external evidence. Certain examples are directed to an enhanced retrieval pipeline that improves LLM performance by retrieving relevant facts before generating answers. Certain examples are directed to improving temporal QA accuracy by integrating multiple heterogeneous sources of time-sensitive information. The importance of temporal reasoning extends to downstream applications such as claim verification. Certain examples introduce an end-to-end system for verifying temporal claims, demonstrating the necessity of accurate time-based retrieval and reasoning. However, the above examples may assume that all queries require temporal reasoning, which may not reflect real-world usage patterns. Certain examples herein address this limitation by proposing an adaptive approach that automatically balances temporal-aware and semantic (e.g., "standard") retrieval based on each query's temporal importance.

Enhanced Temporal Understanding in Retrieval-Augmented Generation for Machine Learning Turning now to the figures, FIG. 1 is a diagram illustrating an environment 100 including a provider network 101 (e.g., cloud) that includes one or more machine learning models 110, 112, 122, and/or 132 that utilize temporal-aware retrieval to generate a response 134 for a query 106 from a user device 102 according to some examples.

In certain examples, input device 104 (e.g., keyboard, speaker, etc.) receives a query 106 (e.g., generated from a prompt provided to the user device 102). In certain examples, the query 106 is a string of words (e.g., in question format). In certain examples, user device 102 includes a display/audio output 108, e.g., to present the response 134.

Certain examples herein utilize enhance RAG performed by machine learning model 132 (e.g., LLM) that is to generate a response(s) 134 based on input 130 of the query and a (e.g., RAG input) combined rank 128 of results for the query. Certain examples herein enhance RAG by incorporating temporal reasoning through two main components: temporal term processing service/system 110 (e.g., including one or more machine learning (ML) models) and temporal-aware ranking and/or retrieval service/system 122 (e.g., including one or more ML models).

In certain examples, during corpus (e.g., documents, files, etc.) indexing, the temporal term processing service/system 110 standardizes all temporal expressions within documents into a normalized format to ensure consistent processing across the dataset. In certain examples, the temporal term processing service/system 110 applies the same normalization process to temporal terms (e.g., temporal expressions) in each incoming query 106. In certain examples, this standardization enables precise temporal matching during retrieval by calculating date-range overlap between queries and documents. In certain examples, a combined results (e.g., documents) rank 128 combines temporal (e.g., documents) rank 126 (e.g., temporal relevance measures) with semantic (e.g., documents) rank (e.g., similarity scores) using a temporal mixing coefficient 126 (e.g., as adaptive weighting values), e.g., which is adjusted based on the temporal requirements of the given question.

Temporal Term Processing

In certain examples, temporal question answering hinges on accurately identifying and interpreting time-related expressions within queries. In certain examples, the temporal term processing service/system 110 use an ML model (e.g., LLM) to extract temporal terms and convert them into standardized date ranges. In certain examples, this conversion process transforms various temporal expressions into a consistent format, e.g., a same Year-Month-Day format, YYYY-MM-DD, representing both the start and end points of the temporal span. Certain examples herein employ prompting strategies with few-shot examples to guide the ML model (e.g., LLM) of the temporal term processing service/system 110 in identifying temporal expressions within queries, e.g., ranging from explicit dates to more ambiguous temporal references. In certain examples, this standardization enables consistent processing of diverse temporal references across the framework. In certain examples, a specific date like "2005 August 10th" is mapped to 2005 Aug. 10 to 2005 Aug. 10, while approximate periods such as "the early 2000s" are mapped to precise ranges (e.g., from 2000 Jan. 1 to 2004 Dec. 31).

In certain examples herein, the temporal term processing service/system 110 performs a corpus preparation (e.g., external) data source(s) 114. In certain examples herein, the temporal term processing service/system 110 extracts temporal expressions (e.g., temporal terms) from each data source 114 (e.g., document), e.g., in parallel with dense retrieval indexing, and stores the resulting standardized temporal terms 114A (e.g., date ranges) for each document, e.g., alongside their embeddings used for a search.

In certain examples herein, the temporal term processing service/system 110 applies the same temporal normalization process to each incoming query's temporal expression(s) during inference, e.g., enabling straightforward interval comparisons with the preprocessed documents in external data source(s) 114.

In certain examples herein, the temporal term processing service/system 110 receives a query 106, analyzes (e.g., via a ML model) the query 106 for any temporal expressions, e.g., and then (i) removes the temporal expression (e.g., deletes the temporal text, numbers, etc.) to generate query 106B without that temporal expression(s) and sends query 106B to retrieval and ranking service/system 112 (e.g., ML model thereof) and/or (ii) generates query 106A which includes the (e.g., standardized form of) temporal expression and sends query 106A to temporal-aware ranking service/system 122 (e.g., ML model thereof).

Temporal-Unaware Retrieval/Ranking

In certain examples, retrieval and ranking service/system 112 (e.g., ML model thereof) is to generate a set of one or more results (e.g., candidate documents 116) for query 106B. In certain examples, the retrieval and ranking service/system 112 (e.g., ML model thereof) is to generate a similarity (e.g., relevance) score for the set of one or more results (e.g., candidate documents 116) and/or rank the results (e.g., candidate documents 116) based on the scores. In certain examples, the similarity (e.g., relevance) score is between zero and one (or zero and one hundred, etc.). In certain examples, the search is a (e.g., dense) semantic search that considers the meaning and intent behind query 106, e.g., a search that leverages text embeddings (e.g., vectors of numerical representations of meaning generated by a language ML models). In certain examples, the embeddings capture the semantic relationships between words, e.g., allowing for a context-aware document retrieval. In certain examples, embedding are generated for the text of both a query 106 (e.g., query 106B) and the documents from data source(s) 114 in an embedding space, and dense (e.g., vector) searches are performed to find candidate document(s) 116 that align closely with the user's query intent, e.g., where the higher the alignment, the higher the similarity score.

In certain examples, the candidate documents 116 are ranked (e.g., from most similar to least similar to the query 106) to generate semantic rank 118, e.g., a plurality of sets of semantic ranks from different semantic rankers.

Temporal-Aware Retrieval/Ranking

In certain examples, after the (e.g., dense) retrieval of an initial set of candidate documents 116, the temporal-aware ranking service/system 122 applies a temporal refinement step to focus on documents that satisfy the temporal constraints of the query 106 (e.g., the temporal expression from query 106A). In certain examples, the temporal-aware ranking service/system 122 determines temporal relevance scores, e.g., based on an amount of overlap between temporal ranges from candidate documents and the temporal range of the incoming query 106A. In certain examples, the temporal-aware ranking service/system 122 generates a temporal rank 124 of the candidate documents 116. In certain examples, the temporal-aware ranking service/system 122 temporally ranks the documents based on their temporal relevance scores. In certain examples, the temporal-aware ranking service/system 122 combines the semantic similarity score (e.g., from the dense retrieval stage) for a candidate document with the temporal relevance score for the candidate document, e.g., combined based on the temporal mixing coefficient 126, to generate a combined score. In certain examples, the temporal-aware ranking service/system 122 generates a combined rank 128 of the candidate documents from the combined scores for the candidate documents 116. In certain examples, the temporal-aware ranking service/system 122 combines the semantic rank(s) 118 for a candidate document with the temporal rank(s) 124 for the candidate document, e.g., combined based on the temporal mixing coefficient 126, to generate a combined rank 128. In certain examples, the temporal mixing coefficient 126 (e.g., for a particular query 106) is determined based on the temporal importance of the incoming query 106.

Temporal Relevance

In certain examples, the retrieval process begins with the (e.g., dense) retrieval to identify an initial set of candidate documents 116, followed by a temporal refinement step that evaluates temporal constraints. In certain examples, for each candidate document, the provider network 101 (e.g., temporal-aware ranking service/system 122) determine the temporal relevance based on the overlap (e.g., in units of years, months, weeks, days, hours, seconds, etc.) between the temporal ranges of the document and the query. In certain examples, these temporal relevance scores are then combined with the initial dense retrieval similarity scores using the temporal mixing coefficient 126 (e.g., adaptive weight(s)) that reflect the temporal requirements of the incoming query.

In certain examples, the temporal relevance score ($R_{temp}$) for a given query (q) and a candidate document (c) is determined as follows:

$$R_{temp}\ (q, c) = \frac{\text{Overlap of } c \text{ and } q}{e_c - s_c};\ \text{if Overlap} > 0 \text{ and}$$

$$R_{temp}\ (q, c) = -\tanh(\Delta_{qc});\ \text{if Overlap} \leq 0$$

where $$\Delta_{qc} = \min(|s_q - e_c|, |e_q - s_c|)$$

represents the minimum distance between the time spans, $s_q$ is the start of a time range for a query, and $e_q$ is the end of the time range for the query, and $s_c$ is the start of a time range for a candidate document, and $e_c$ is the end of the time range for the candidate document.

In certain examples, the resulting temporal relevance score ($R_{temp}$) ranges from −1 to 1, e.g., with higher values indicating greater temporal alignment between the document and query.

In certain examples, this computation maintains linear time complexity, O(K), where K denotes the number of candidate documents.

Adaptive Combination with Temporal Importance

In certain examples, the importance of temporal alignment varies across different queries, necessitating an adaptive approach to combining temporal and semantic relevance. In certain examples, temporal constraints are crucial when querying personal records (e.g., "Collect all medical records from 2020"), while they may be less critical for general information queries (e.g., "How many years did the Great Depression last from 1929?"), where temporal terms might not significantly affect retrieval results. In certain examples, the provider network 101 (e.g., temporal-aware ranking service/system 122) determines the temporal mixing coefficient 126 (e.g., adaptive weighting) by analyzing how temporal constraints influence retrieval outcomes. In certain examples, the temporal-aware ranking service/system 122 compares results between an original query q and a temporally perturbed query q', where q' is created by removing temporal expressions from q.

In certain examples, the temporal mixing coefficient 126 (α) is determined as follows:

$$\alpha = 1 - \frac{1}{k}\sum_{i=1}^{k} \mathbb{I}\ (r_i\ (q) = r_i\ (q'))$$

where $r_i$(q) denotes the i-th retrieved document for query q, II is an indicator function returning 1 when the retrieved documents match (e.g., are the same document) and 0 otherwise, and k is the number of top retrieved documents considered. In certain examples, this formulation yields a low temporal mixing coefficient (α) value when temporal expressions minimally impact retrieval results (e.g., when $r_i(q)=r_i(q')$ frequently occurs), thus indicating limited temporal dependence; and conversely, a high a value emerges when temporal expressions significantly alter the retrieved document set.

In certain examples, the combined (e.g., "final") rank $R_{combined}$ 128 (e.g., ranking score) combines temporal relevance $R_{temp}$ with dense retrieval score $R_{dense}$ using α as the mixing coefficient, e.g., as follows:

$$R_{combined} = \alpha \cdot R_{temp} + (1 - \alpha) \cdot R_{dense}$$

In certain examples, the combined rank 128 is used as the RAG input to machine learning model (e.g., LLM) 132. In certain examples, a subset of less than all of the candidate documents 116 is selected based on the combined rank, e.g., and the subset of documents is used as the RAG input to machine learning model (e.g., LLM) 132 (e.g., where the ML model also takes as input the query 106 (e.g., and prompt)).

In certain examples, the machine learning model (e.g., LLM) 132 takes as input 130 the query 106 (e.g., and prompt) and combined rank 128, and generates a response to the query 106 based on the combined rank 128 (e.g., based on the query and a RAG input of a subset of the documents as determined based on the combined rank 128), e.g., and sends the response to the user device 102.

Although separate ML models (e.g., as an ensemble of ML models) are shown, it should be understood that any one or more ML models may be used, for example, where the ML model in temporal term processing service/system 110 and temporal-aware ranking service/system 122 is a single temporal ML model.

Examples herein are not capable of being performed by a human because performing a temporal-aware retrieval-augmented generation (RAG) for machine learning cannot practically be performed in the human mind (or by a human using a pen and paper), e.g., because such a solution is not practically scalable and extensible and cannot be performed in the available time between receipt of a query until a user expects to receive a response, e.g., in real time.

Figure 2:
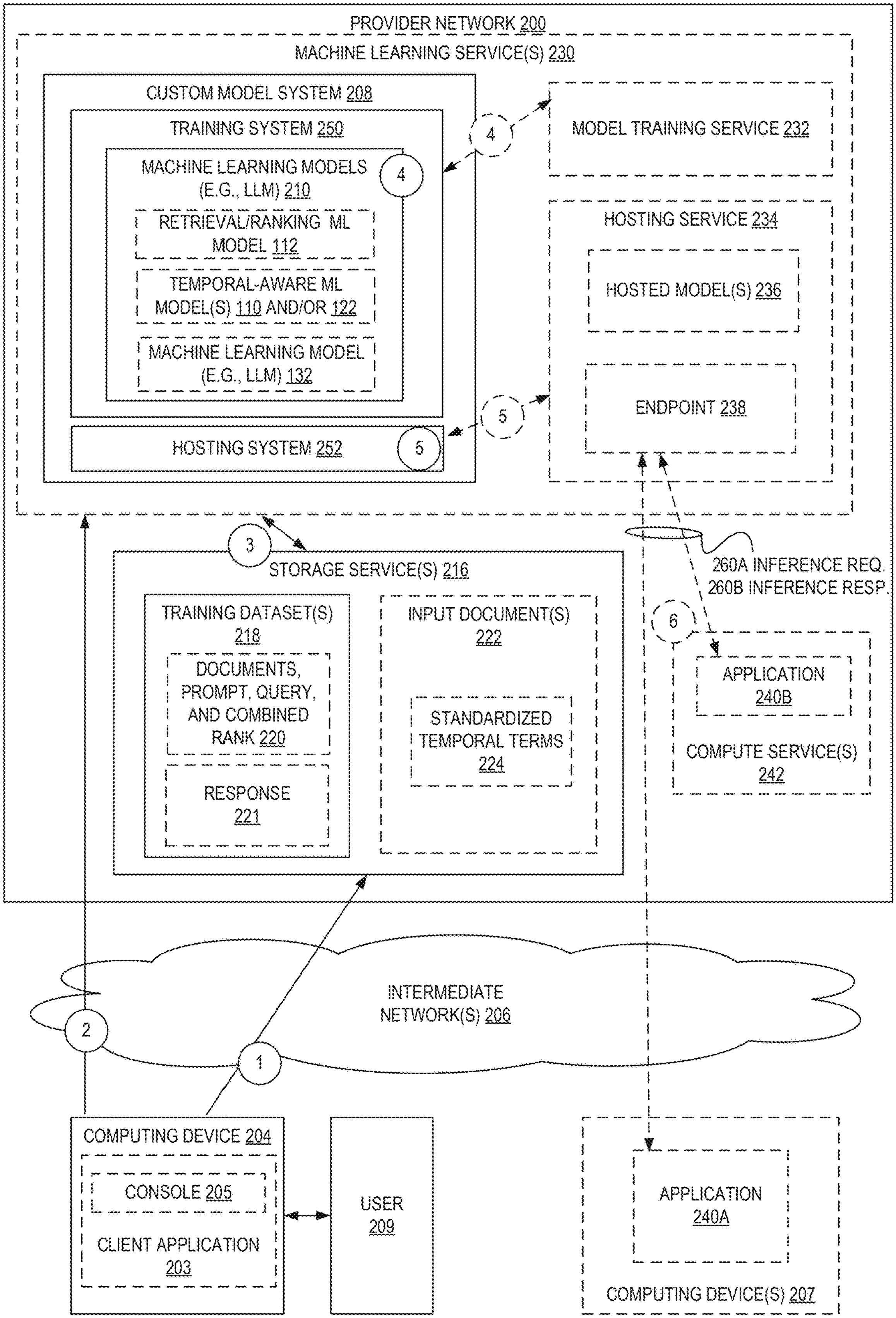
FIG. 2 is a diagram illustrating an environment for creating, training, and using a machine learning model according to some examples.

FIG. 2 is a diagram illustrating an environment for creating, training, and using a machine learning model(s) 210 (e.g., one or more of retrieval/ranking ML model 112, temporal-aware ML model(s) 110 and/or 122, or ML model (e.g., LLM) 132) according to some examples. FIG. 2 includes one or more storage services 216, one or more machine learning services 230, and one or more compute services 242 implemented within a multi-tenant provider network 200. Each of the one or more storage services 216, one or more machine learning services 230, one or more model training services 232, one or more hosting services 234, and one or more compute services 242 may be implemented via software, hardware, or a combination of both, and may be implemented in a distributed manner using multiple different computing devices.

A provider network 200 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances or a serverless code execution service that executes code (either of which may be referred to herein as a compute service 242), a storage service 216 that can store data objects, etc. The users (or "customers") of provider networks 200 may utilize one or more user accounts that are associated with a customer account, though these terms may be used somewhat interchangeably depending upon the context of use. Users may interact with a provider network 200 across one or more intermediate networks 206 (e.g., the internet) via one or more interface(s), such as through use of application programming interface (API) calls, via a console 205 implemented as a website or application, etc. The interface(s) may be part of, or serve as a front-end to, a control plane of the provider network 200 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 200 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code-typically without the user having any control of or knowledge of the underlying compute instance(s) involved.

For example, in various examples, a "serverless" function may include code provided by a user or other entity—such as the provider network itself—that can be executed on demand. Serverless functions may be maintained within provider network 200 by an on-demand code execution service (which may be one of compute service(s) 242) and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions (e.g., as an application 240B) that can be executed on demand, without requiring the user to maintain dedicated infrastructure to execute the serverless function. Instead, the serverless functions can be executed on demand using resources maintained by the provider network 200. In some examples, these resources may be maintained in a "ready" state (e.g., having a pre-initialized runtime environment configured to execute the serverless functions), allowing the serverless functions to be executed in near real-time.

The training system 250, for example, may enable users to generate one or more machine learning models 210 (e.g., retrieval/ranking ML model 112, temporal-aware ML model(s) 110 and/or 122, and/or ML model (e.g., LLM) 132).

Examples herein allow the creation of one or more retrieval/ranking ML model 112, temporal-aware ML model(s) 110 and/or 122, and/or ML model (e.g., LLM) 132 by supplying a training dataset 218 (for example, including documents, prompts, queries, semantic scores/ranking, temporal scores/ranking, and/or combined scores/ranking 220 and/or response 221).

In some examples, the provider network 101 in FIG. 1—via use of a custom model system 208—allows users to build and use model(s) 210.

At a high level, machine learning may include two major components that are required to be put in place in order to expose advertised functionality to the customer: (i) training and (ii) inference. Training may include the following responsibilities: training data analysis; data split (training, evaluating (e.g., development or validation), and/or testing data); model selection; model training; model evaluation; and status reporting. Inference may include the following responsibilities: model loading and hosting; and inference (e.g., synchronous and batch).

Training may include training a candidate algorithm into model(s), e.g., into machine learning model(s) 210, and respective configurations (e.g., coefficients and/or hyperparameters). Training may perform a grid search over the matrix of experiments (e.g., defined upfront) in search for the model and its parameters (e.g., hyperparameters) that performs best on the given dataset.

Thus, a user 209 may provide or otherwise identify data 218 (e.g., documents, prompts, queries, semantic scores/ranking, temporal scores/ranking, and/or combined scores/ranking 220 and/or response 221) for use in creating a custom model. For example, as shown at circle (1), the user 209 may utilize a client application 203 executed by a computing device 204 (e.g., a web-application implementing a console 205 for the provider network 200, a standalone application, another web-application of another entity that utilizes the machine learning model(s) as a part of its backend, a database or mixed-SQL environment, etc.) to cause the computing device 204 to upload the data 218 to a storage location (e.g., provided by a storage service 216 such as an object storage service of a provider network 200).

The data 218 may be semi-structured. The data 218 may be a columnar dataset that includes rows (or entries) of data values, where the data values may be arranged according to one or more columns (or attributes) and may be of a same datatype (e.g., one storing text). In some cases, the data 218 includes headings or other metadata describing names or datatypes of the columns, though in some cases this metadata may not exist. For example, some or all of the data 218 may have been provided by a user as a plaintext file (e.g., a comma-separated values (CSV) or tab-separated values (TSV) file), an exported database table or structure, an application-specific file such as a spreadsheet, etc.

For example, when a user 209 desires to train a model(s) 210, this file (or files) may include labels corresponding to the file, e.g., with a label indicating the scores/ranking.

Thereafter, at circle (2) the computing device 204 may issue one or more requests (e.g., API calls) to the machine learning service 230 that indicate the user's 209 desire to train one or more algorithms into model(s) 210. The request may be of a type that identifies which type of model(s) are to be created or identifies that the machine learning service 230 itself is to identify the candidate model(s). The request may also include one or more of an identifier of a storage location or locations storing the data 218 (e.g., an identifier of documents, prompts, queries, semantic scores/ranking, temporal scores/ranking, and/or combined scores/ranking 220 and/or response 221), which may identify a storage location (e.g., via a Uniform Resource Locator (URL), a bucket/folder identifier, etc.) within the provider network 200 (e.g., as offered by a storage service 216) or external to the provider network 200. In some examples, the request includes an identifier (e.g., from the user 209) of the candidate algorithm(s) themselves within the request. In certain examples, the storage service 216 stores input file(s) 222, for example, documents and/or their standardized temporal terms 224.

Responsive to receipt of the request, the custom model system 208 of the machine learning service 230 is invoked and begins operations for training the corresponding type of model. For example, the custom model system 208 may identify what type of model is to be trained (e.g., via analyzing the method call associated with the request), the storage location(s) associated with the data 218, etc. Thus, the custom model system 208 may retrieve any stored data 218 elements as shown at circle (3), which may be from a storage location within the provider network 200 or external to the provider network 200.

In some examples, the training (at circle (4)) of model(s) 210 includes performing (at optional, dotted circle (4)) by training service 232 of machine learning service 230 a particular training job (e.g., hyperparameter optimization tuning job), or the like.

In some examples, the hosting system 252 (at circle (5)) of the custom model system 208 may make use (at optional, dotted circle (5)) of a hosting service 234 of a machine learning service 230 to deploy a model as a hosted model 236 in association with an endpoint 238 that can receive inference requests from client applications 240A and/or 240B at circle (8), provide the inference requests 260A to the associated hosted model(s) 236, and provide inference results 260B (e.g., a prediction) back to applications 240A and/or 240B, which may be executed by one or more computing devices 207 outside of the provider network 200 or by one or more computing devices of a compute service 242 (e.g., hardware virtualization service, serverless code execution service, etc.) within the provider network 200. Inference results 260B may be displayed to a user and/or viewer (e.g., in a graphical user interface of the application) and/or exported as a data structure (e.g., in a selected format). In certain examples, the inference results are utilized by one or more of the components in FIG. 1.

Figure 3:
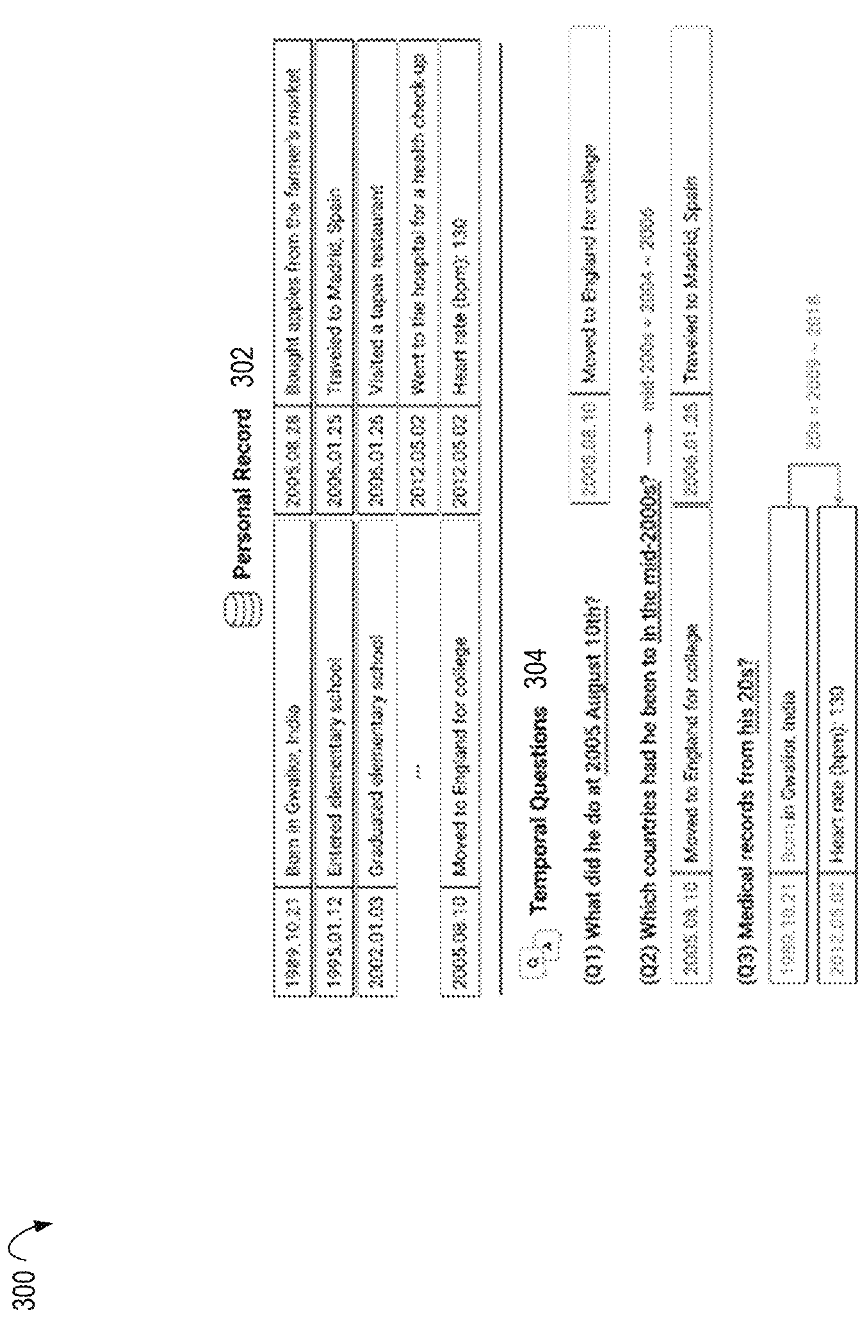
FIG. 3 is a diagram illustrating the challenges of interpretation in temporal expressions according to some examples.

FIG. 3 is a diagram 300 illustrating the challenges of interpretation in temporal expressions (e.g., time-related numbers, words, and/or phrases from text) according to some examples. Diagram 300 includes a personal record 302 of temporal expressions (shown as year.month.day) and the corresponding data. Diagram 300 further includes example temporal questions 304.

In certain examples, the temporal term processing service/system 110 use an ML model (e.g., LLM) to extract temporal terms from personal record 302 and converts them into standardized date ranges. In certain examples, this conversion process transforms various temporal expressions into a consistent format, e.g., a same Year-Month-Day format, YYYY-MM-DD, representing both the start and end points of the temporal span. In certain examples, this standardization enables consistent processing of diverse temporal references across the framework. In certain examples, a specific date like "2005 August 10th" is mapped to 2005 Aug. 10 to 2005 Aug. 10, while approximate periods such as "the mid 2000s" are mapped to precise ranges (e.g., from 2004 Jan. 1 to 2006 Dec. 31).

Figure 4:
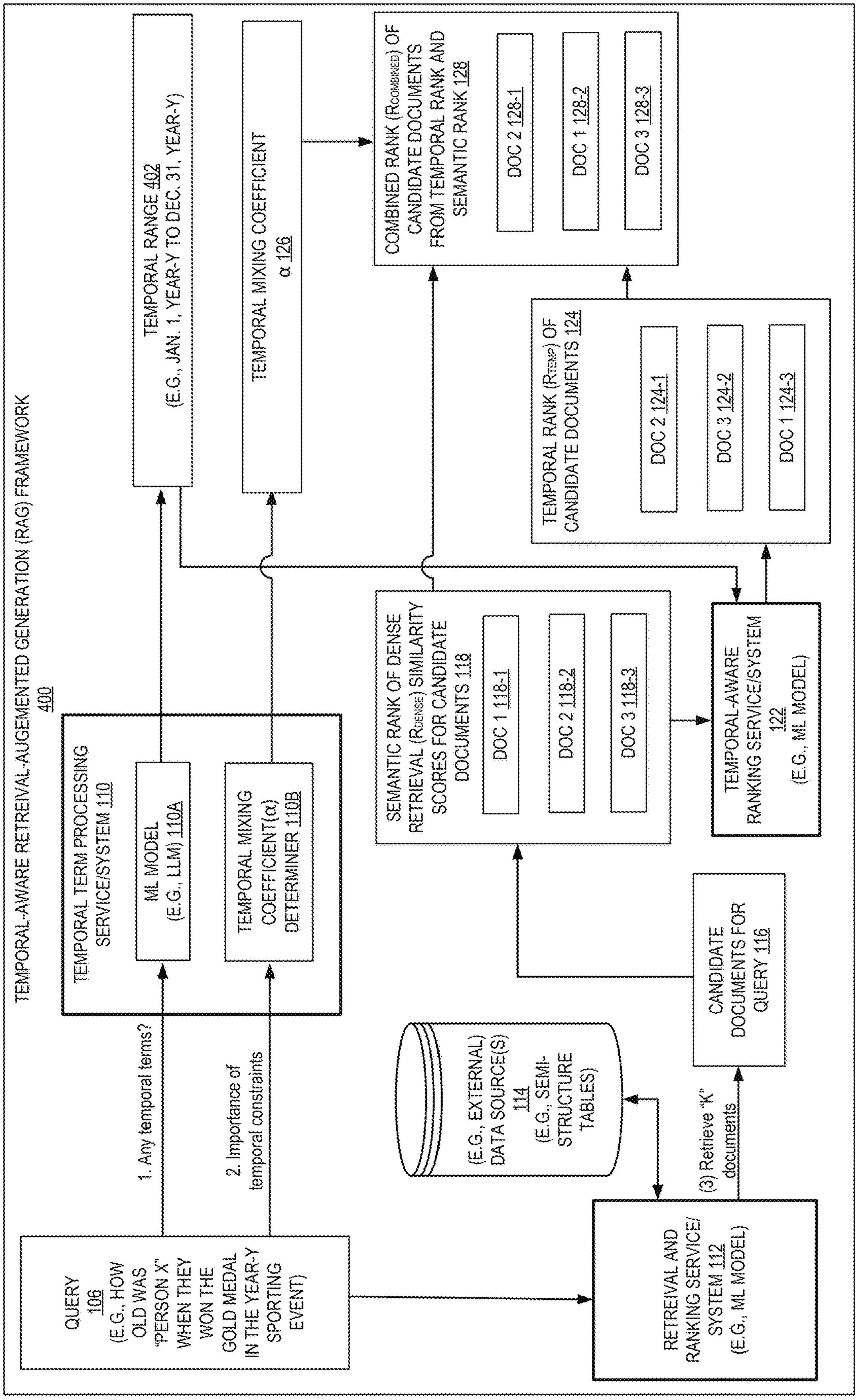
FIG. 4 is a diagram illustrating temporal-aware retrieval-augmented generation (RAG) framework according to some examples.

FIG. 4 is a diagram illustrating temporal-aware retrieval-augmented generation (RAG) framework 400 according to some examples. In certain examples, the query 106 is received (e.g., how old was person X when they won the gold medal in the year Y sporting event), and temporal term processing service/system 110 (e.g., ML model 110A thereof) is to determine if there is any temporal term in the query 106, e.g., and if so, converting that to a standardized temporal range 402. In certain examples, the temporal range 402 is sent to temporal-aware ranking service/system 122.

In certain examples (e.g., if there is any temporal term in the query 106) temporal term processing service/system 110 (e.g., temporal mixing coefficient determiner 110B thereof) is to determine the temporal mixing coefficient 126, e.g., based on the importance of the temporal term to the query itself. In certain examples, the temporal mixing coefficient 126 is used (e.g., by temporal-aware ranking service/system 122) to generate combined rank 128 of documents. For examples, where the semantic rank 118 of documents 1, 2, and 3: with document 1 as the highest semantic rank 118-1, document 2 as the next highest semantic rank 118-2, and document 3 as the lowest semantic rank 118-3; the temporal rank 124 of documents 1, 2, and 3: with document 2 as the highest temporal (e.g., but not semantic) rank 124-1, document 3 as the next highest temporal (e.g., but not semantic) rank 124-2, and document 1 as the lowest temporal (e.g., but not semantic) rank 124-3, and combined rank 128 (e.g., using temporal mixing coefficient 126) of documents 1, 2, and 3: with document 2 as the highest combined rank 128-1, document 1 as the next highest combined rank 128-2, and document 3 as the lowest combined rank 128-3.

In certain examples, the answer for query 106 is generated from (e.g., the content from) highest "combined rank" document 2 128-1. In certain examples, the answer for query 106 is generated from (e.g., the content from) the highest subset of "combined rank" documents, e.g., a subset of less than "k" number of documents. In certain examples, the highest subset of "combined rank" documents is provided to the machine learning model (e.g., LLM) 132, e.g., and the machine learning model (e.g., LLM) 132 is to generate an answer to the query based on that subset of documents (e.g., but not the other documents).

Although the above discusses documents as the search corpus, it should be understood that other data may be searched, e.g., files, websites, articles, audio files, videos, etc.

Figure 5:
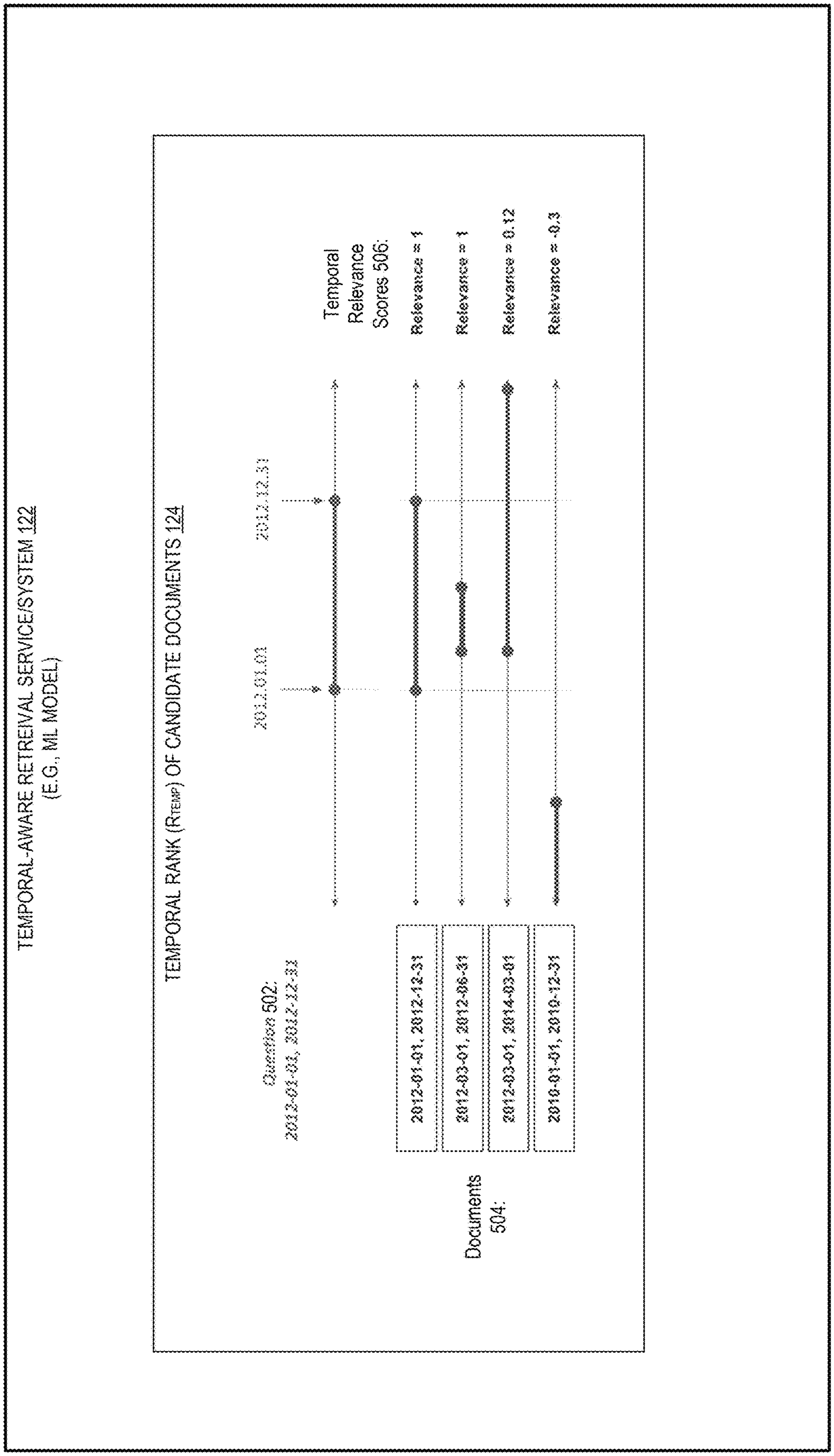
FIG. 5 is a diagram illustrating temporal relevance scores for documents that include temporal expressions based on a temporal expression in a question according to some examples.

FIG. 5 is a diagram illustrating temporal relevance scores 506 for documents 504 that include temporal expressions based on a temporal expression in a question according to some examples. In certain examples, a question 502 includes a temporal expression (e.g., the range of 2012 Jan. 1 to 2012 Dec. 23) and the documents 504 includes a temporal expression (e.g., within the text of the document and/or the creation/modification data of the document), e.g., the temporal-aware ranking service/system 122 generates a corresponding temporal relevance score 506 that indicates an amount of overlap of the temporal range of the question 502 to the temporal range of the documents (e.g., as shown by the lines in FIG. 5). In certain examples, the temporal relevance scores 506 are utilized to rank the documents based on (e.g., only) their temporal relevance to the temporal expression(s) in the question 502, and thus to generate temporal rank 124.

Figure 6:
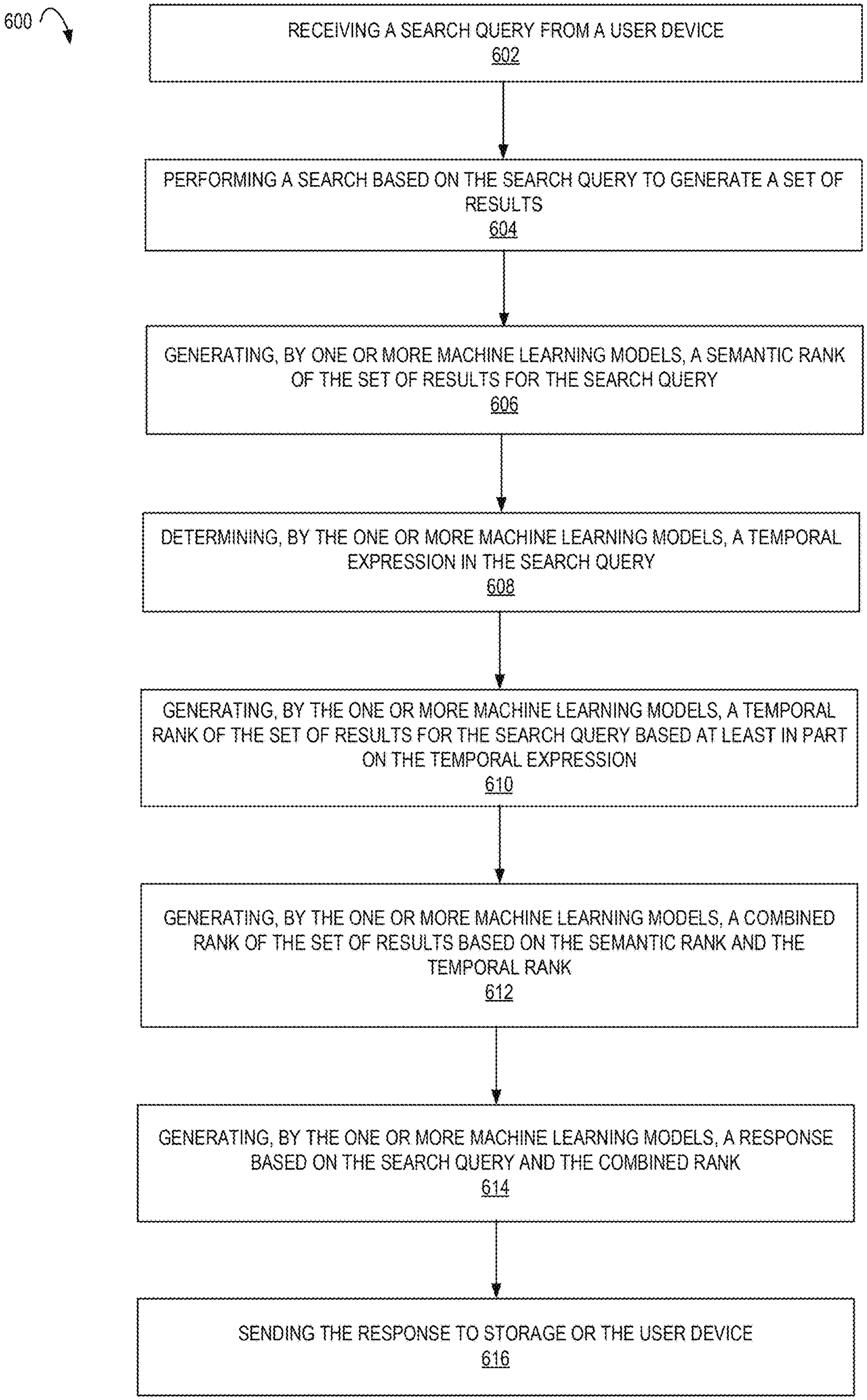
FIG. 6 is a flow diagram illustrating operations of a method of performing a temporal-aware retrieval-augmented generation (RAG) for a machine learning model according to some examples.

FIG. 6 is a flow diagram illustrating operations 600 of a method of performing a temporal-aware retrieval-augmented generation (RAG) for a machine learning model according to some examples. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 600 are performed by components (e.g., in provider network) of the other FIGS.

The operations 600 include, at block 602, receiving a search query from a user device. The operations 600 further include, at block 604, performing a search based on the search query to generate a set of results. The operations 600 further include, at block 606, generating, by one or more machine learning models, a semantic rank of the set of results for the search query. The operations 600 further include, at block 608, determining, by the one or more machine learning models, a temporal expression in the search query. The operations 600 further include, at block 610, generating, by the one or more machine learning models, a temporal rank of the set of results for the search query based at least in part on the temporal expression. The operations 600 further include, at block 612, generating, by the one or more machine learning models, a combined rank of the set of results based on the semantic rank and the temporal rank. The operations 600 further include, at block 614, generating, by the one or more machine learning models, a response based on the search query and the combined rank. The operations 600 further include, at block 616, sending the response to storage or the user device.

At least some examples of the disclosed technologies can be described in view of the following examples:

Example 1. A computer-implemented method comprising:
- receiving, by a provider network, a search query from a user device;
- performing, by the provider network, a search based on the search query to generate a set of candidate documents;
- generating, by one or more machine learning models of the provider network, a semantic rank of the set of candidate documents for the search query;
- determining, by the one or more machine learning models of the provider network, a temporal expression in the search query;
- generating, by the one or more machine learning models of the provider network, a temporal rank of the set of candidate documents for the search query based at least in part on the temporal expression;
- generating, by the one or more machine learning models of the provider network, a combined rank of the set of candidate documents based on the semantic rank and the temporal rank;
- generating, by the one or more machine learning models of the provider network, a response based on the search query and a retrieval-augmented generation (RAG) input of the combined rank; and
- sending, by the provider network, the response to the user device.

Example 2. The computer-implemented method of example 1, wherein the generating the combined rank of the set of candidate documents comprises:
- generating a temporally perturbed search query by removing the temporal expression from the search query;
- performing a search based on the temporally perturbed search query to generate a second set of candidate documents;
- generating a temporal mixing coefficient based on a comparison of the set of candidate documents for the search query and the second set of candidate documents for the temporally perturbed search query; and
- generating the combined rank based on the temporal mixing coefficient, the semantic rank, and the temporal rank.

Example 3. The computer-implemented method of example 1, wherein the generating the temporal rank of the set of candidate documents for the search query comprises:
- determining a first temporal range for the temporal expression from the search query;

determining a corresponding temporal range for each document of the set of candidate documents; and determining the temporal rank of the set of candidate documents based on an overlap of the first temporal range and the corresponding temporal ranges for the set of candidate documents.

Example 4. A computer-implemented method comprising:

receiving a search query from a user device;

performing a search based on the search query to generate a set of results;

generating, by one or more machine learning models, a semantic rank of the set of results for the search query;

determining, by the one or more machine learning models, a temporal expression in the search query;

generating, by the one or more machine learning models, a temporal rank of the set of results for the search query based at least in part on the temporal expression;

generating, by the one or more machine learning models, a combined rank of the set of results based on the semantic rank and the temporal rank;

generating, by the one or more machine learning models, a response based on the search query and the combined rank; and sending the response to storage or the user device.

Example 5. The computer-implemented method of example 4, wherein the generating the combined rank of the set of results comprises:

generating a temporal mixing coefficient based on the search query; and generating the combined rank based on the temporal mixing coefficient, the semantic rank, and the temporal rank.

Example 6. The computer-implemented method of example 5, wherein the generating the combined rank of the set of results further comprises:

generating a temporally perturbed search query by removing the temporal expression from the search query; and performing a search based on the temporally perturbed search query to generate a second set of results, wherein the generating the temporal mixing coefficient is based on a comparison of the set of results for the search query and the second set of results for the temporally perturbed search query.

Example 7. The computer-implemented method of example 5, wherein the generating the combined rank comprises generating a corresponding combined score for a plurality of results of the set of results that includes a first component based on the temporal mixing coefficient and a semantic score for that result, and a second component based on the temporal mixing coefficient and a temporal score for that result.

Example 8. The computer-implemented method of example 4, wherein the generating the response comprises providing a retrieval-augmented generation (RAG) input based on the combined rank to the one or more machine learning models.

Example 9. The computer-implemented method of example 8, wherein the providing the retrieval-augmented generation (RAG) input comprises providing a subset of the set of results as the retrieval-augmented generation (RAG) input to the one or more machine learning models.

Example 10. The computer-implemented method of example 4, wherein the generating the temporal rank of the set of results for the search query comprises:

determining a first temporal range for the temporal expression from the search query;

determining a corresponding temporal range for each result of the set of results; and determining the temporal rank of the set of results based on an overlap of the first temporal range and the corresponding temporal ranges for the set of results.

Example 11. The computer-implemented method of example 10, further comprising converting the temporal expression from the search query to a single format before generating the temporal rank, wherein the generating the temporal rank of the set of results for the search query is based at least in part on the single format of the temporal expression from the search query.

Example 12. The computer-implemented method of example 11, further comprising converting a temporal expression for each result of the set of results to the single format before generating the temporal rank, wherein the generating the temporal rank of the set of results for the search query is further based on the single format of the temporal expressions from the set of results.

Example 13. The computer-implemented method of example 10, wherein the generating the temporal rank comprises providing a first value for a result based on an overlap of the first temporal range and a corresponding temporal range for the result exceeding zero, and providing a second value when the overlap is zero.

Example 14. The computer-implemented method of example 13, wherein the second value is based on a minimum distance between the first temporal range and the corresponding temporal range for the result.

Example 15. A non-transitory computer-readable medium storing code that, when executed by a device, causes the device to perform a method comprising:

receiving a search query from a user device;

performing a search based on the search query to generate a set of results;

generating, by one or more machine learning models, a semantic rank of the set of results for the search query;

determining, by the one or more machine learning models, a temporal expression in the search query;

generating, by the one or more machine learning models, a temporal rank of the set of results for the search query based at least in part on the temporal expression;

generating, by the one or more machine learning models, a combined rank of the set of results based on the semantic rank and the temporal rank;

generating, by the one or more machine learning models, a response based on the search query and the combined rank; and sending the response to storage or the user device.

Example 16. The non-transitory computer-readable medium of example 15, wherein the generating the combined rank of the set of results comprises:

generating a temporal mixing coefficient based on the search query; and generating the combined rank based on the temporal mixing coefficient, the semantic rank, and the temporal rank.

Example 17. The non-transitory computer-readable medium of example 16, wherein the generating the combined rank of the set of results further comprises:

generating a temporally perturbed search query by removing the temporal expression from the search query; and performing a search based on the temporally perturbed search query to generate a second set of results, wherein the generating the temporal mixing coefficient is based on a comparison of the set of results for the search query and the second set of results for the temporally perturbed search query.

Example 18. The non-transitory computer-readable medium of example 16, wherein the generating the combined rank comprises generating a corresponding combined score for a plurality of results of the set of results that includes a first component based on the temporal mixing coefficient and a semantic score for that result, and a second component based on the temporal mixing coefficient and a temporal score for that result.

Example 19. The non-transitory computer-readable medium of example 15, wherein the generating the response comprises providing a retrieval-augmented generation (RAG) input based on the combined rank to the one or more machine learning models.

Example 20. The non-transitory computer-readable medium of example 15, wherein the generating the temporal rank of the set of results for the search query comprises:

determining a first temporal range for the temporal expression from the search query;

determining a corresponding temporal range for each result of the set of results; and determining the temporal rank of the set of results based on an overlap of the first temporal range and the corresponding temporal ranges for the set of results.

Exemplary environments, systems, etc. that the above may be used in are detailed below.

Figure 7:
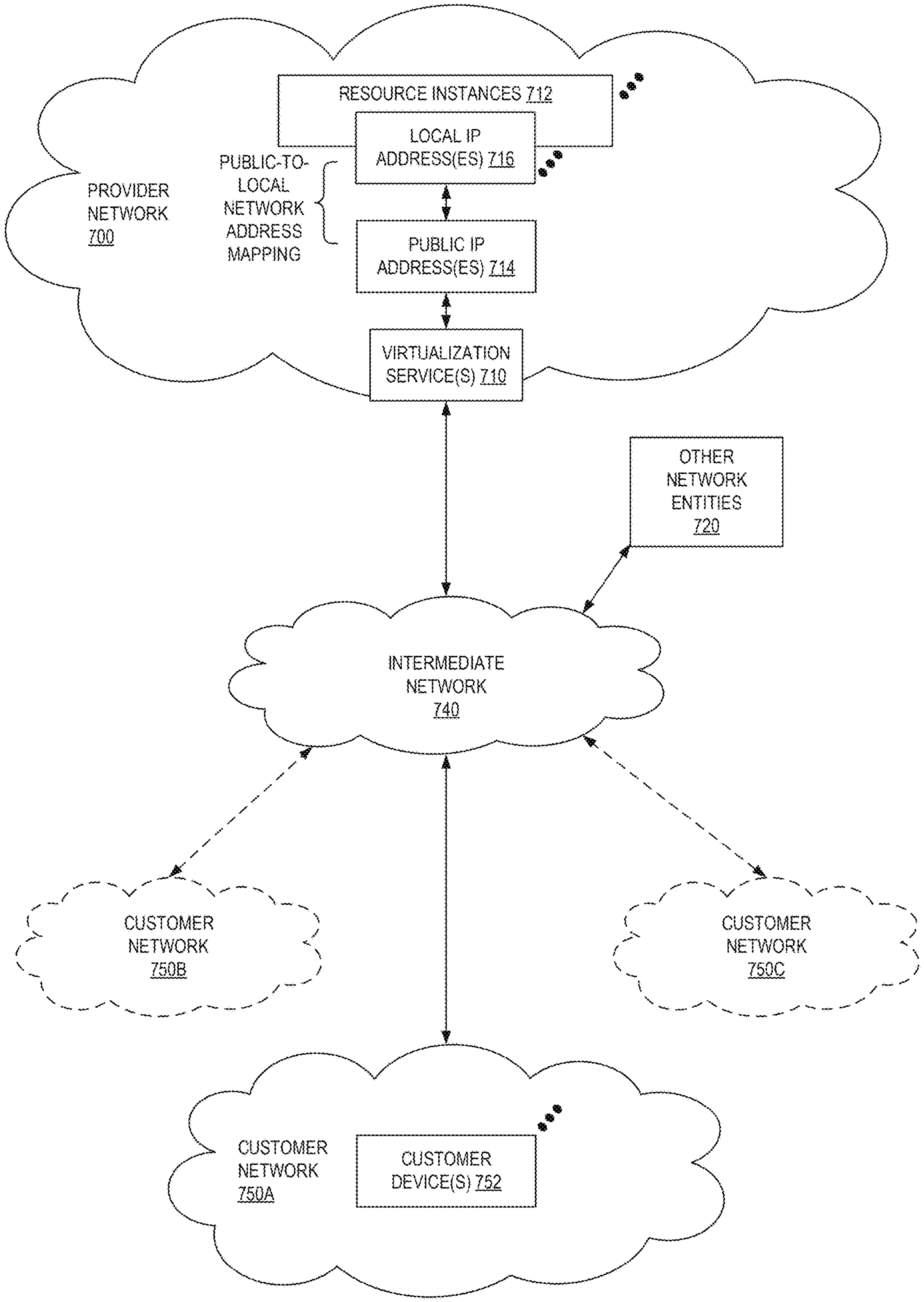
FIG. 7 illustrates an example provider network environment according to some examples.

FIG. 7 illustrates an example provider network (or "service provider system") environment according to some examples. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some examples, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some examples, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
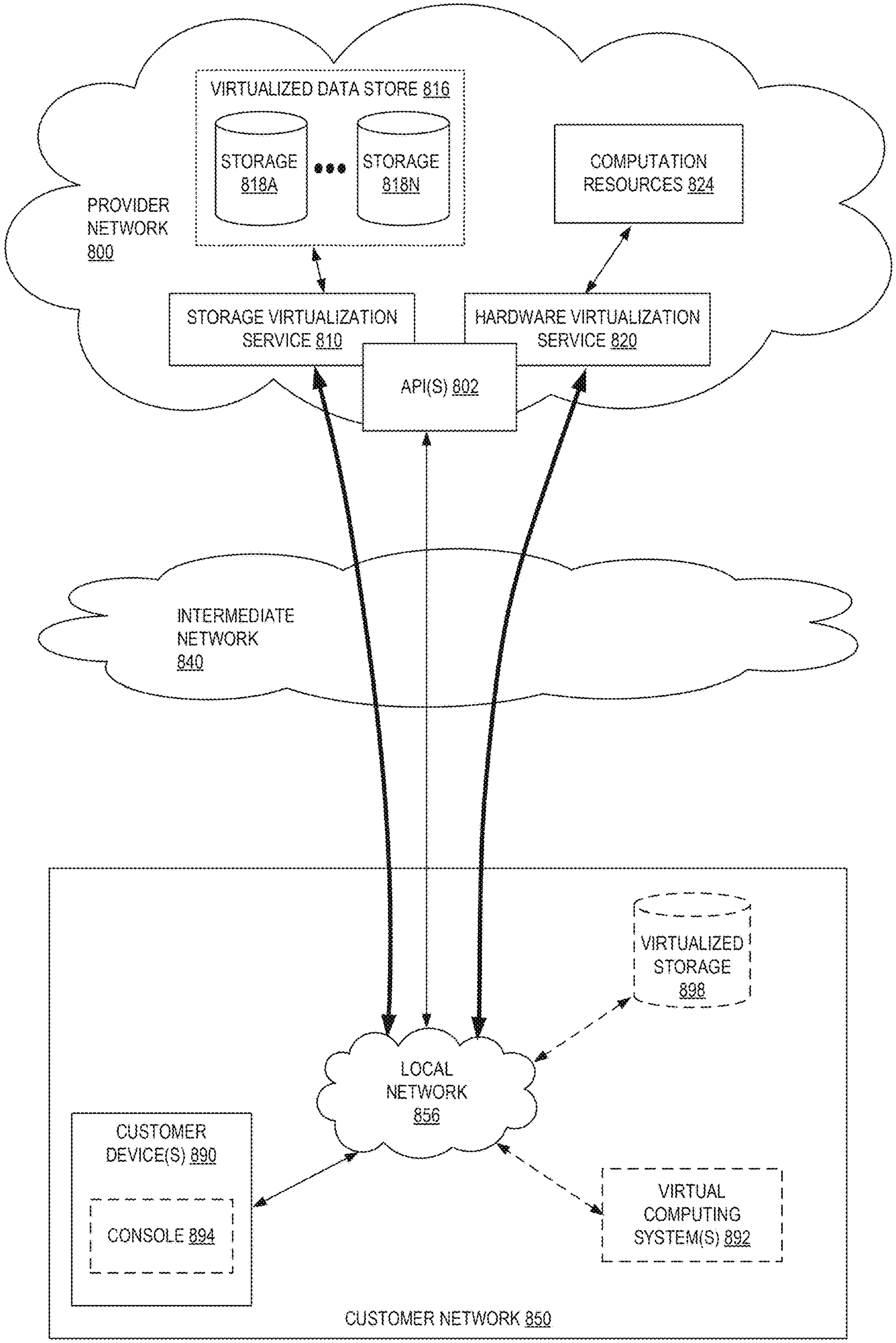
FIG. 8 is a block diagram of an example provider network that provides a storage service and a hardware virtualization service to customers according to some examples.

FIG. 8 is a block diagram of an example provider network that provides a storage service and a hardware virtualization service to customers, according to some examples. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some examples, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some examples, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some examples, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some examples, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
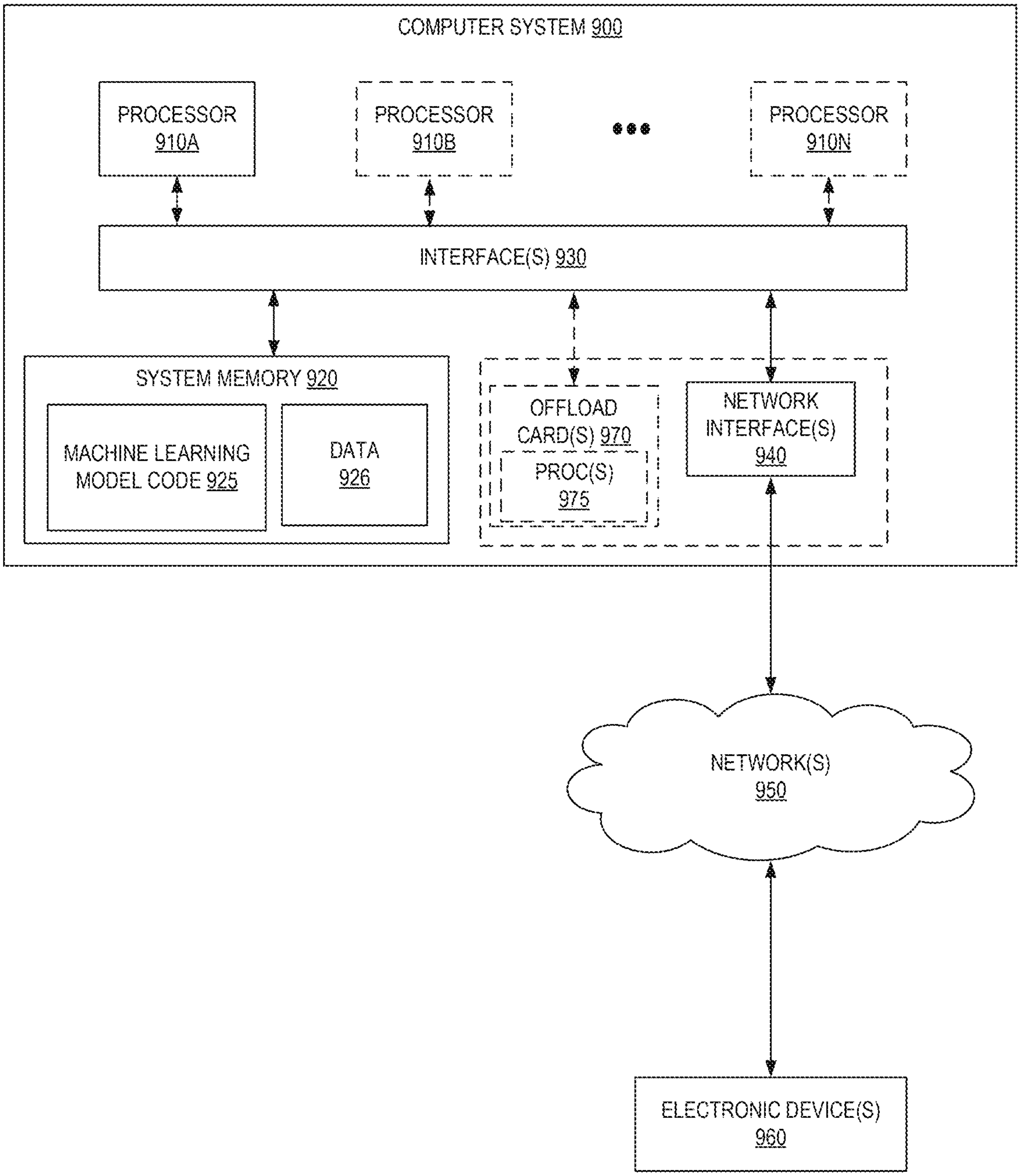
FIG. 9 is a block diagram illustrating an example computer system that may be used in some examples.

In some examples, a system that implements a portion or all of the techniques for content indexing as described herein may include a general-purpose computer system that includes or is configured to access one or more computer-accessible media, such as computer system 900 illustrated in FIG. 9. In the illustrated example, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various examples a computer system 900 may include one computing device or any number of computing devices configured to work together as a single computer system 900.

In various examples, computer system 900 may be a uniprocessor system including one processor 910, or a multiprocessor system including several processors 910 (e.g., two, four, eight, or another suitable number). Processors 910 may be any suitable processors capable of executing instructions. For example, in various examples, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various examples, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above are shown stored within system memory 920 as machine learning model code 925 (e.g., executable to implement, in whole or in part, the operations discussed herein) and data 926.

In one example, I/O interface 930 may be configured to coordinate I/O traffic between processor 910, system memory 920, and any peripheral devices in the device, including network interface 940 or other peripheral interfaces. In some examples, I/O interface 930 may perform any necessary protocol, timing, or other data transformations to convert data signals from one component (e.g., system memory 920) into a format suitable for use by another component (e.g., processor 910). In some examples, I/O interface 930 may include support for devices attached through various types of peripheral buses, such as a variant of the Peripheral Component Interconnect (PCI) bus standard or the Universal Serial Bus (USB) standard, for example. In some examples, the function of I/O interface 930 may be split into two or more separate components, such as a north bridge and a south bridge, for example. Also, in some examples some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various examples, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some examples, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some examples the offload card(s) 970 can perform compute instance management operations such as pausing and/or un-pausing compute instances, launching and/or terminating compute instances, performing memory transfer/copying operations, etc. These management operations may, in some examples, be performed by the offload card(s) 970 in coordination with a hypervisor (e.g., upon a request from a hypervisor) that is executed by the other processors 910A-910N of the computer system 900. However, in some examples the virtualization manager implemented by the offload card(s) 970 can accommodate requests from other entities (e.g., from compute instances themselves), and may not coordinate with (or service) any separate hypervisor.

In some examples, system memory 920 may be one example of a computer-accessible medium configured to store program instructions and data as described above. However, in other examples, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some examples of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Figure 10:
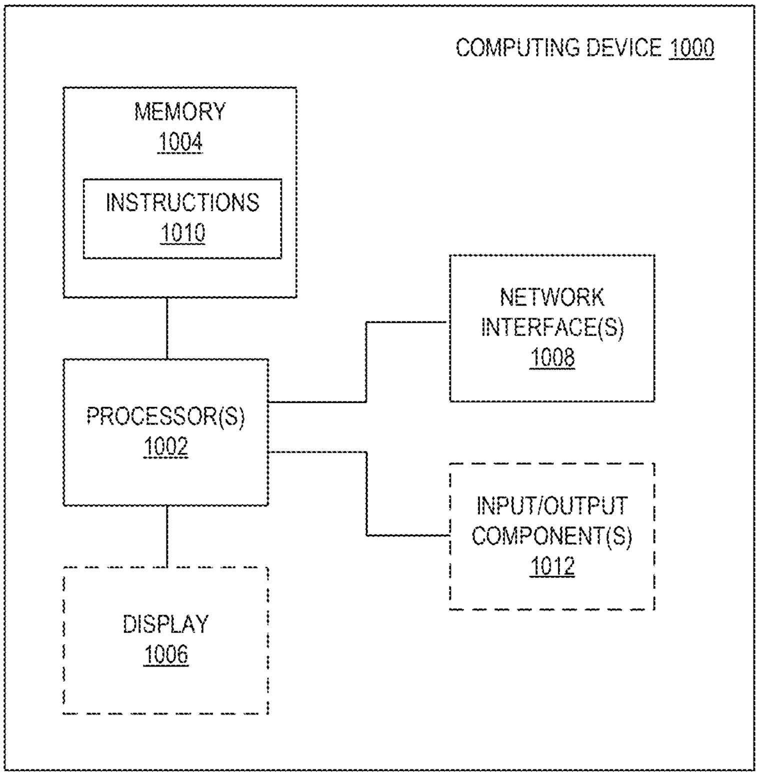
FIG. 10 illustrates a logical arrangement of a set of general components of an exemplary computing device that can be utilized in accordance with various examples.

FIG. 10 illustrates a logical arrangement of a set of general components of an example computing device 1000. Generally, a computing device 1000 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1002 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1004) to store code (for example, instructions 1010, e.g., which implement a content delivery service as disclosed herein), and a set of one or more wired or wireless network interfaces 1008 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1004) of a given electronic device typically stores code (e.g., instructions 1010) for execution on the set of one or more processors 1002 of that electronic device. One or more parts of various examples may be implemented using different combinations of software, firmware, and/or hardware.

A computing device 1000 can include some type of display element 1006, such as a touch screen or liquid crystal display (LCD), although many devices such as portable media players might convey information via other means, such as through audio speakers, and other types of devices such as server end stations may not have a display element 1006 at all. As discussed, some computing devices used in some examples include at least one input and/or output component(s) 1012 able to receive input from a user. This input component can include, for example, a push button, touch pad, touch screen, wheel, joystick, keyboard, mouse, keypad, or any other such device or element whereby a user is able to input a command to the device. In some examples, however, such a device might be controlled through a combination of visual and/or audio commands and utilize a microphone, camera, sensor, etc., such that a user can control the device without having to be in physical contact with the device.

Figure 11:
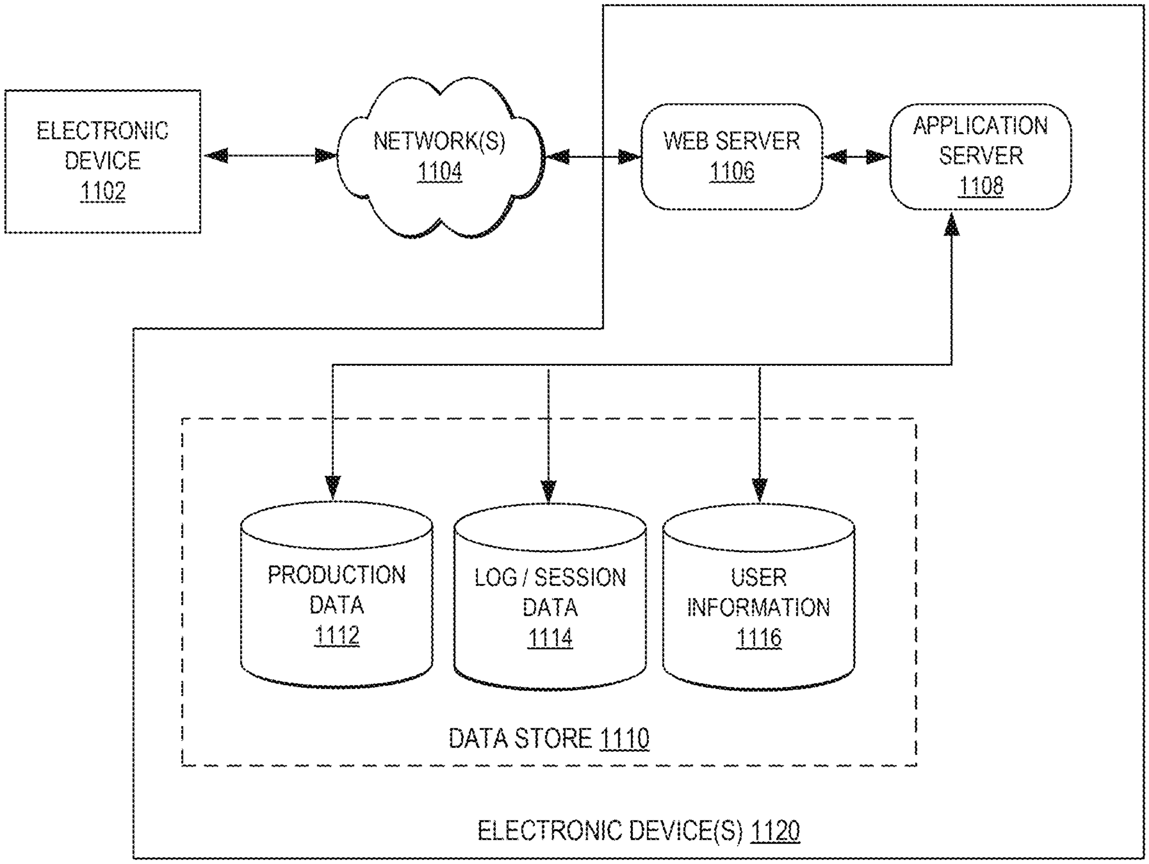
FIG. 11 illustrates an example of an environment for implementing aspects in accordance with various examples.

As discussed, different approaches can be implemented in various environments in accordance with the described examples. For example, FIG. 11 illustrates an example of an environment 1100 for implementing aspects in accordance with various examples. For example, in some examples messages are HyperText Transfer Protocol (HTTP) requests that are received by a web server (e.g., web server 1106), and the users, via electronic devices, may interact with the provider network via a web portal provided via the web server 1106 and application server 1108. As will be appreciated, although a web-based environment is used for purposes of explanation, different environments may be used, as appropriate, to implement various examples. The system includes an electronic client device 1102, which may also be referred to as a client device and can be any appropriate device operable to send and receive requests, messages, or information over an appropriate network 1104 and convey information back to a user of the device 1102. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1104 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1104 includes the Internet, as the environment includes a web server 1106 for receiving requests and serving content in response thereto, although for other networks an alternative device serving a similar purpose could be used, as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device 1102 and handling a majority of the data access and business logic for an application. The application server 1108 provides access control services in cooperation with the data store 1110 and is able to generate content such as text, graphics, audio, video, etc., to be transferred to the client device 1102, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1102 and the application server 1108, can be handled by the web server 1106. It should be understood that the web server 1106 and application server 1108 are not required and are merely example components, as structured code discussed herein can be executed on any appropriate device or host machine as discussed elsewhere herein.

The data store 1110 can include several separate data tables, databases, or other data storage mechanisms and media for storing data relating to a particular aspect. For example, the data store illustrated includes mechanisms for storing production data 1112 and user information 1116, which can be used to serve content for the production side. The data store 1110 also is shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update, or otherwise process data in response thereto. In one example, a user might submit a search request for a certain type of item. In this case, the data store 1110 might access the user information 1116 to verify the identity of the user and can access a production data 1112 to obtain information about items of that type. The information can then be returned to the user, such as in a listing of results on a web page that the user is able to view via a browser on the user device 1102. Information for a particular item of interest can be viewed in a dedicated page or window of the browser.

The web server 1106, application server 1108, and/or data store 1110 may be implemented by one or more electronic devices 1120, which can also be referred to as electronic server devices or server end stations, and may or may not be located in different geographic locations. Each of the one or more electronic devices 1120 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the environment 1100 in FIG. 11 should be taken as being illustrative in nature and not limiting to the scope of the disclosure.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most examples utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle (R), Microsoft (R), Sybase (R), IBM (R), etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Bracketed text and blocks with dashed borders (e.g., large dashes, small dashes, dot-dash, and dots) may be used herein to illustrate optional operations that add additional features to some examples. However, such notation should not be taken to mean that these are the only options or optional operations, and/or that blocks with solid borders are not optional in certain examples.

Reference numerals with suffix letters (e.g., 818A-818N) may be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various examples.

References to "one example," "an example," "certain examples," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given example requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:

receiving, by a provider network, a search query from a user device;

performing, by the provider network, a search based on the search query to generate a first set of candidate documents;

generating, by one or more machine learning models of the provider network, a semantic rank of the first set of candidate documents for the search query;

determining, by the one or more machine learning models of the provider network, a temporal expression in the search query;

generating, by the one or more machine learning models of the provider network, a temporally perturbed search query by removing the temporal expression from the search query:

performing, by the provider network, a search based on the temporally perturbed search query to generate a second set of candidate documents;

generating, by the one or more machine learning models of the provider network, a temporal rank of the first set of candidate documents for the search query based at least in part on the temporal expression;

generating, by the one or more machine learning models of the provider network, a combined rank of the first set of candidate documents for the search query based on the semantic rank and the temporal rank;

generating, by the one or more machine learning models of the provider network, a response based on the search query and a retrieval-augmented generation (RAG) input of the combined rank; and sending, by the provider network, the response to the user device.

2. The computer-implemented method of claim 1, wherein the generating the combined rank of the set of candidate documents further comprises:

generating a temporal mixing coefficient based on a comparison of the first set of candidate documents for the search query and the second set of candidate documents for the temporally perturbed search query; and generating the combined rank based on the temporal mixing coefficient, the semantic rank, and the temporal rank.

3. The computer-implemented method of claim 1, wherein the generating the temporal rank of the first set of candidate documents for the search query comprises:

determining a first temporal range for the temporal expression from the search query;

determining a corresponding temporal range for each document of the first set of candidate documents; and determining the temporal rank of the first set of candidate documents based on an overlap of the first temporal range and the corresponding temporal ranges for the first set of candidate documents.

4. A computer-implemented method comprising:

receiving a search query from a user device;

performing a search based on the search query to generate a first set of results;

generating, by one or more machine learning models, a semantic rank of the first set of results for the search query;

determining, by the one or more machine learning models, a temporal expression in the search query;

generating, by the one or more machine learning models, a temporally perturbed search query by removing the temporal expression from the search query;

performing a search based on the temporally perturbed search query to generate a second set of results;

generating, by the one or more machine learning models, a temporal rank of the first set of results for the search query based at least in part on the temporal expression;

generating, by the one or more machine learning models, a combined rank of the first set of results for the search query based on the semantic rank and the temporal rank;

generating, by the one or more machine learning models, a response based on the search query and the combined rank; and sending the response to storage or the user device.

5. The computer-implemented method of claim 4, wherein the generating the combined rank of the set of results further comprises:

generating a temporal mixing coefficient based on the search query; and generating the combined rank based on the temporal mixing coefficient, the semantic rank, and the temporal rank.

6. The computer-implemented method of claim 5, wherein the generating the temporal mixing coefficient is based on a comparison of the first set of results for the search query and the second set of results for the temporally perturbed search query.

7. The computer-implemented method of claim 5, wherein the generating the combined rank comprises generating a corresponding combined score for a plurality of results of the set of results that includes a first component based on the temporal mixing coefficient and a semantic score for that result, and a second component based on the temporal mixing coefficient and a temporal score for that result.

8. The computer-implemented method of claim 4, wherein the generating the response comprises providing a retrieval-augmented generation (RAG) input based on the combined rank to the one or more machine learning models.

9. The computer-implemented method of claim 8, wherein the providing the RAG input comprises providing a subset of the set of results as the RAG input to the one or more machine learning models.

10. The computer-implemented method of claim 4, wherein the generating the temporal rank of the first set of results for the search query comprises:

determining a first temporal range for the temporal expression from the search query;

determining a corresponding temporal range for each result of the set of results; and determining the temporal rank of the set of results based on an overlap of the first temporal range and the corresponding temporal ranges for the set of results.

11. The computer-implemented method of claim 10, further comprising converting the temporal expression from the search query to a single format before generating the temporal rank, wherein the generating the temporal rank of the first set of results for the search query is based at least in part on the single format of the temporal expression from the search query.

12. The computer-implemented method of claim 11, further comprising converting a temporal expression for each result of the set of results to the single format before generating the temporal rank, wherein the generating the temporal rank of the first set of results for the search query is further based on the single format of the temporal expressions from the set of results.

13. The computer-implemented method of claim 10, wherein the generating the temporal rank comprises providing a first value for a result based on an overlap of the first temporal range and a corresponding temporal range for the result exceeding zero, and providing a second value when the overlap is zero.

14. The computer-implemented method of claim 13, wherein the second value is based on a minimum distance between the first temporal range and the corresponding temporal range for the result.

15. A non-transitory computer-readable medium storing code that, when executed by a device, causes the device to perform a method comprising:

receiving a search query from a user device;

performing a search based on the search query to generate a first set of results;

generating, by one or more machine learning models, a semantic rank of the first set of results for the search query;

determining, by the one or more machine learning models, a temporal expression in the search query;

generating, by the one or more machine learning models, a temporally perturbed search query by removing the temporal expression from the search query;

performing a search based on the temporally perturbed search query to generate a second set of results;

generating, by the one or more machine learning models, a temporal rank of the first set of results for the search query based at least in part on the temporal expression;

generating, by the one or more machine learning models, a combined rank of the first set of results for the search query based on the semantic rank and the temporal rank;

generating, by the one or more machine learning models, a response based on the search query and the combined rank; and sending the response to storage or the user device.

16. The non-transitory computer-readable medium of claim 15, wherein the generating the combined rank of the set of results further comprises:

generating a temporal mixing coefficient based on the search query; and generating the combined rank based on the temporal mixing coefficient, the semantic rank, and the temporal rank.

17. The non-transitory computer-readable medium of claim 16, wherein the generating the temporal mixing coefficient is based on a comparison of the first set of results for the search query and the second set of results for the temporally perturbed search query.

18. The non-transitory computer-readable medium of claim 16, wherein the generating the combined rank comprises generating a corresponding combined score for a plurality of results of the set of results that includes a first component based on the temporal mixing coefficient and a semantic score for that result, and a second component based on the temporal mixing coefficient and a temporal score for that result.

19. The non-transitory computer-readable medium of claim 15, wherein the generating the response comprises providing a retrieval-augmented generation (RAG) input based on the combined rank to the one or more machine learning models.

20. The non-transitory computer-readable medium of claim 15, wherein the generating the temporal rank of the first set of results for the search query comprises:

determining a first temporal range for the temporal expression from the search query;

determining a corresponding temporal range for each result of the set of results; and determining the temporal rank of the set of results based on an overlap of the first temporal range and the corresponding temporal ranges for the set of results.

* * * * *